United States Patent
Kim et al.

(10) Patent No.: US 9,365,114 B2
(45) Date of Patent: Jun. 14, 2016

(54) HIGH VOLTAGE SYSTEM OF ELECTRIC VEHICLES

(75) Inventors: Suk Hyung Kim, Gyeonggi-do (KR); Jae Hoon Choi, Gyeonggi-do (KR); Do Kyoung Lim, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 897 days.

(21) Appl. No.: 13/191,620

(22) Filed: Jul. 27, 2011

(65) Prior Publication Data

US 2012/0139338 A1  Jun. 7, 2012

(30) Foreign Application Priority Data

Dec. 7, 2010 (KR) ........................ 10-2010-0123910

(51) Int. Cl.
| | | |
|---|---|---|
| *B60R 25/04* | (2013.01) | |
| *E05B 17/00* | (2006.01) | |
| *H01H 27/00* | (2006.01) | |
| *B60L 1/00* | (2006.01) | |
| *B60R 25/24* | (2013.01) | |

(52) U.S. Cl.
CPC . *B60L 1/00* (2013.01); *B60R 25/24* (2013.01); *B60R 25/04* (2013.01)

(58) Field of Classification Search
CPC ...... B60R 25/045; B60R 25/04; B60R 25/24; B60R 25/1003; B60R 25/1018; B60L 1/00; H02J 7/00
USPC ........ 307/9.1, 10.1–10.6, 11; 340/438, 636.1; 320/109; 180/65.21
See application file for complete search history.

(56) References Cited

U.S. PATENT DOCUMENTS

| | | | | |
|---|---|---|---|---|
| 3,850,260 | A * | 11/1974 | Obermeit | B60R 25/21 180/287 |
| 6,384,489 | B1 * | 5/2002 | Bluemel | H02J 1/08 307/10.1 |
| 7,400,113 | B2 * | 7/2008 | Osborne | H02J 7/0018 320/118 |
| 8,188,616 | B2 * | 5/2012 | Nordstrom | B60R 16/03 307/10.1 |
| 8,203,232 | B2 * | 6/2012 | Pino | B60L 3/12 307/10.1 |
| 8,453,773 | B2 * | 6/2013 | Hill | B60K 1/04 180/65.29 |
| 8,531,053 | B2 * | 9/2013 | Choi | B60K 6/48 180/65.265 |
| 2010/0025132 | A1 * | 2/2010 | Hill | B60K 1/04 180/65.29 |
| 2010/0181827 | A1 * | 7/2010 | Cunningham | B60R 25/24 307/9.1 |
| 2012/0013297 | A1 * | 1/2012 | Turner | B60L 11/14 320/109 |
| 2012/0112533 | A1 * | 5/2012 | Yarmak | B60L 11/14 307/10.1 |

FOREIGN PATENT DOCUMENTS

| | | |
|---|---|---|
| JP | 10174201 A | 6/1998 |
| JP | 2002-010408 A | 1/2002 |
| JP | 2008-149897 A | 7/2008 |
| KR | 10-1999-0051465 | 7/1999 |
| KR | 10-2003-0081691 | 10/2003 |

* cited by examiner

*Primary Examiner* — Rexford Barnie
*Assistant Examiner* — Jagdeep Dhillon
(74) *Attorney, Agent, or Firm* — Mintz Levin Cohn Ferris Glovsky and Popeo, P.C.; Peter F. Corless

(57) ABSTRACT

The present invention provides a high voltage system of an electric vehicle. More particularly, it relates to a high voltage system of an electric system which makes it possible to remove a sub-battery conventionally required in such systems by allowing a high voltage battery to function as the sub-battery. The high voltage system includes a high voltage battery, in which a cell and/or a module of the high voltage battery is connected to low voltage electric equipment through an NC relay, such that power of the cell and/or the module of the high voltage battery is supplied to the low voltage electric equipment at ignition-off.

5 Claims, 5 Drawing Sheets

HIGH VOLTAGE SYSTEM OF ELECTRIC VEHICLES

CROSS-REFERENCE TO RELATED APPLICATION

This application claims under 35 U.S.C. §119(a) the benefit of Korean Patent Application No. 10-2010-0123910 filed Dec. 7, 2010, the entire contents of which are incorporated herein by reference.

BACKGROUND (a) Technical Field

The present invention relates to a high voltage system of an electric vehicle. More particularly, it relates to a high voltage system of an electric vehicle which makes it possible to eliminate a sub-battery by providing a high voltage battery that can function as the sub-battery.

(b) Background Art

In general, electric vehicles refer to those which utilize electricity for power to a large extent, and an HEV (Hybrid Electric Vehicle), a PHEV (Plug-in Hybrid Electric Vehicle), and an EV (Electric Vehicle) are typical electric vehicles.

As shown in FIG. 1, a high voltage system of an electric vehicle includes a high voltage battery 1, an inverter, an LDC 2, an electric compressor, and a high voltage motor 4. As further shown, a sub-battery 3 (e.g., a lead-acid battery of 12V) is further used, in addition to the high voltage battery 1, to operate common electric equipment, except for high voltage components which are generally operated by the high voltage battery.

In an electric vehicle, the sub-battery 3 is generally (1) used after charging it with the power source of the high voltage battery using LDC 2, (2) used to operate common low voltage electric equipment, or (3) used to control relay-on/off in starting the vehicle.

As described above, the high voltage battery 1 of a high voltage system of an electric vehicle according to the related art always receives power from the sub-battery 3 for relay-on/off in starting the vehicle and for the low voltage electric equipment (see FIG. 2). Accordingly, an additional space is required for accommodating the sub-battery 3. As a result, space availability is reduced and layout becomes difficult.

Further, since the life span of the sub-battery is relatively short, it becomes necessary to replace a plurality of batteries while using the vehicle. This results in additional costs over time.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a high voltage system of an electric vehicle which makes it possible to eliminate the need for a sub-battery. In particular, the present invention provides a high voltage system if an electric vehicle wherein a single cell or a single module in a high voltage battery is directly connected to low voltage electric equipment requiring low voltage, through an NC relay. In certain aspects, one or more cells and/or modules can be provided in connection with the low voltage electric equipment.

In one aspect, the present invention provides a high voltage system of an electric vehicle including a high voltage battery, in which one or more cells and/or modules (preferably a single cell or a single module) of the high voltage battery is connected to low voltage electric equipment through an NC relay, such that power of the cell(s) and/or module(s) of the high voltage battery is supplied to the low voltage electric equipment at ignition-off.

In a preferred embodiment, the high voltage battery turns on a high voltage relay by using the power of the cell(s) and/or module(s) at ignition-on. Further, power of an LDC connected to the high voltage battery through the high voltage relay is supplied to the low voltage electric equipment after the ignition-on.

According to the present invention, it is possible to eliminate the need for the sub-battery that is conventionally required, and, thus, the sub-battery can be removed. In particular, according to the present invention, by connecting one or more cells and/or module(s) (preferably a single cell or a single module) of a high voltage battery directly to a circuit of low voltage electric equipment to function as the sub-battery, the sub-battery can be eliminated.

Therefore, it is possible to reduce an additional cost for the sub-battery and efficiently use the space available by ensuring an advantageous layout, in addition to reducing the manufacturing cost and weight in designing a vehicle. Further, it is possible to improve commercial value by ensuring the space needed and increase fuel efficiency by reducing the weight.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Preferred embodiments of the present invention are described hereafter in detail with reference to the accompanying drawings. These descriptions and accompanying drawings, which illustrate certain preferred embodiments, are not intended to limit the same.

The present invention relates to a high voltage system of an electric vehicle, which is designed to remove the need for a sub-battery, and thus allow for the removal or elimination of such sub-batteries conventionally used in high voltage systems. In particular, the present invention relates to a high voltage system configured to allow a high voltage battery 10 to supply power to common electric equipment that is operated by low voltage power.

For this operation, a high voltage system of an electric vehicle according to an embodiment of the present invention includes a high voltage battery 10 and an LDC 13 (Low Voltage DC-DC converter), a high voltage relay 12, and an NC relay 14 (Normal Close Relay).

Figure 1:
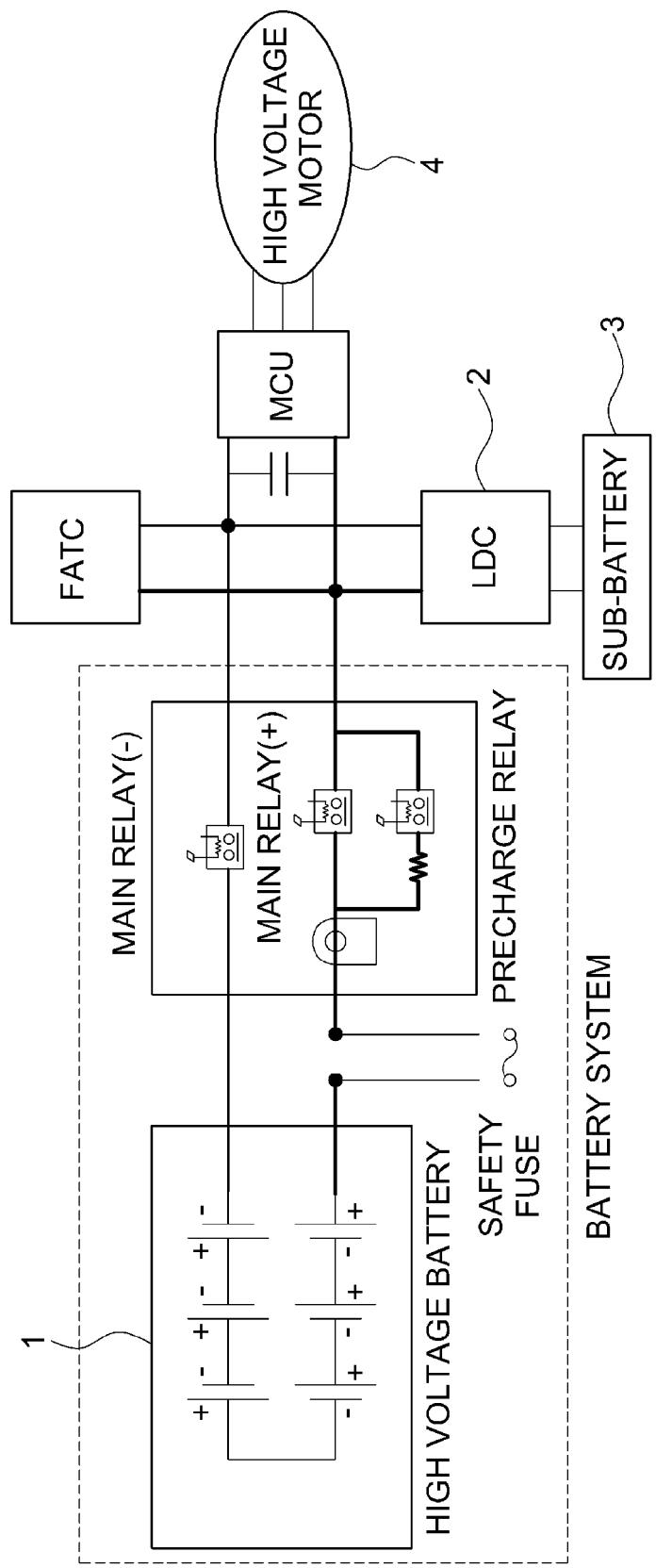
FIG. 1 is a diagram illustrating the configuration of a high voltage system of an electric vehicle of the related art.
Figure 2:
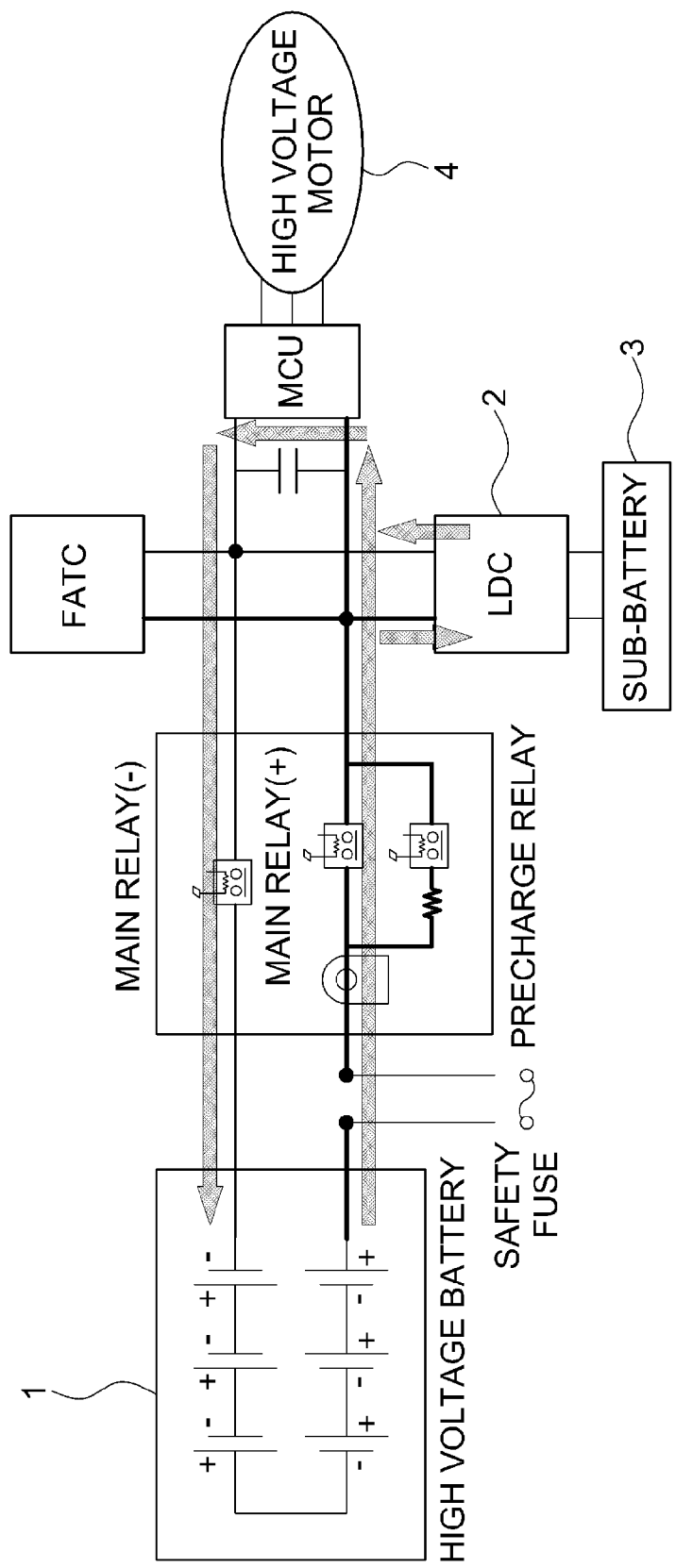
FIG. 2 is a diagram illustrating the operation of the high voltage system shown in FIG. 1.
Figure 3:
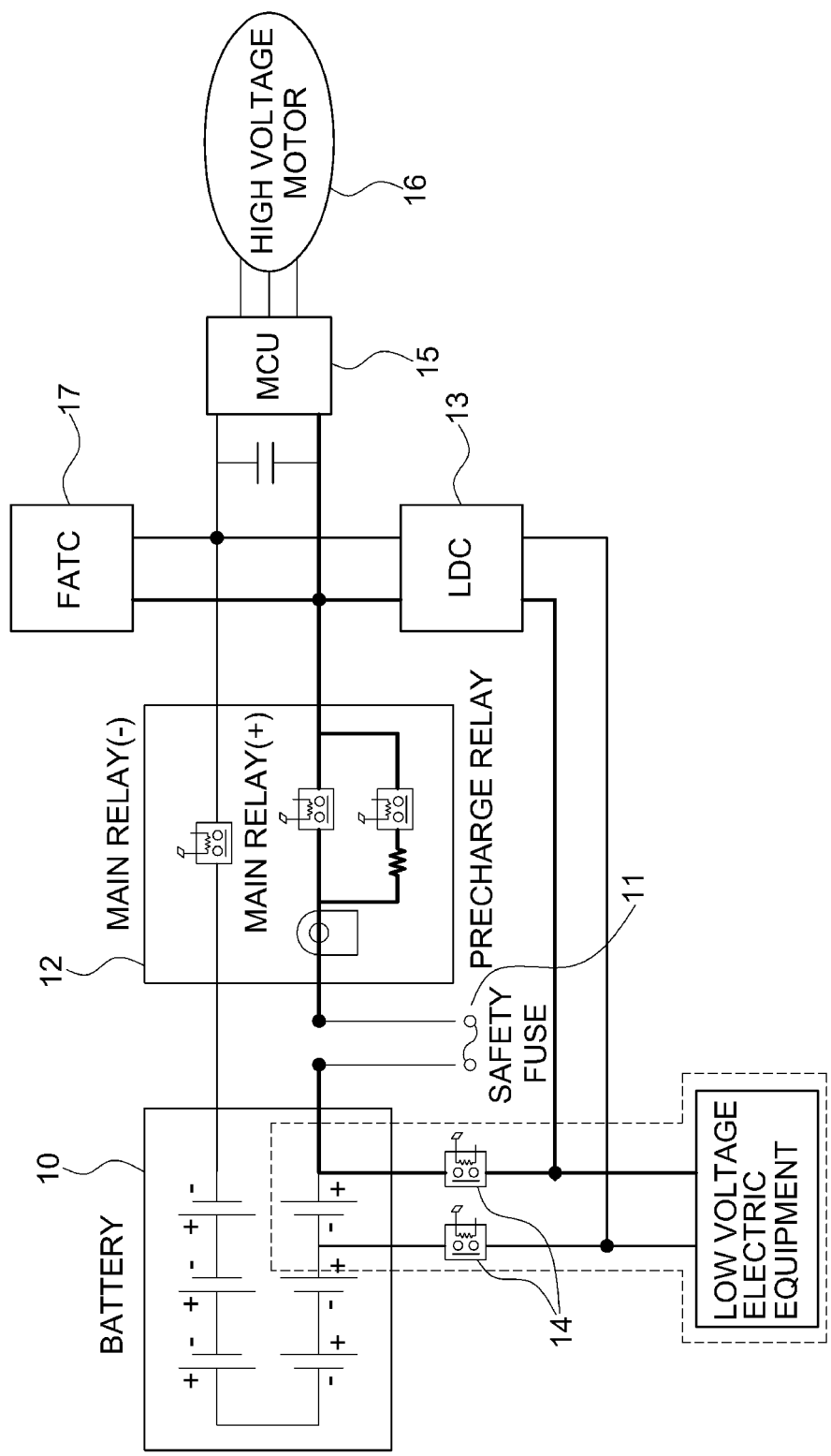
FIG. 3 is a diagram illustrating a high voltage system of an electric vehicle according to an embodiment of the present invention.

In an embodiment of the present invention, as shown in FIG. 3, a single cell of the high voltage battery 10 or a single module of the high voltage battery 10 is in connection with, preferably directly connected to, low voltage electric equipment through the NC relay 14. As such, the power of the single cell or the single module of the high voltage battery 10 is always in connection with a low voltage circuit to supply low voltage power and operate the low voltage electric equipment, even at ignition-off. While in various embodiments, a single cell or module of the high voltage battery is in connection with low voltage electric equipment through the relay, a combination of one or more cells and/or modules could be used, if desired. Thus, it is understood that in the following description, reference to a single cell or a single module can be modified in accordance with the present invention to include any combination of one or more cells and/or modules.

Further, in accordance with embodiments of the present invention, it is possible to start the vehicle by using the power of the single cell or the single module of the high voltage battery 10. In particular, power of the single cell or the single module of the high voltage battery 10 can be supplied through the LDC 13 connected between the NC relay 14 and the low voltage components, so as to provide the initial power for the high voltage relay 12 and an MCU 15 at ignition-on and start operations.

In various embodiments, the NC relay 14 has a switch terminal that is opened in response to an operation signal, as is well known in the art. Thus, the switch terminal is opened in relay-on and closed in relay-off, such that the NC relay 14 is connected.

As further shown in FIG. 3, a safety fuse 11 and the high voltage relay 12 can be directly connected to the high voltage battery 10, while the LDC 13 connected to the high voltage relay 12 is directly connected to the low voltage current equipped with the low voltage electric equipment.

The LDC 13 functions as a power supply for the low voltage electric equipment when the vehicle travels, such that it functions as the conventionally used sub-battery. Further, the LDC 13 ensures safety by separating the high voltage circuit and the low voltage circuit due to NC relay-off.

In particular, the LDC 13 reduces the high-voltage power of the high voltage battery 10 to low voltage in accordance with the converting operation, and when the NC relay 14 is turned on and the relay becomes disconnected, supplies the low voltage to the low voltage electric equipment.

In particular, the high voltage battery 10 functions as a power supply for the low voltage electric equipment by functioning as (e.g., in place of) the conventional sub-battery at the ignition-off state, and further functions as a driving power supply for the initial-On operation of the high voltage relay at the ignition-on state Further, the high voltage battery 10 functions to supply high voltage power for starting the vehicle, particularly by stopping it's function as the sub-battery and returning to the high voltage circuit after the ignition-on. At this time, when the high voltage battery 10 stops functioning as the sub-battery, the LDC instead functions as (e.g., in place of) the sub-battery (e.g., at the ignition-on state), as described above.

The present invention makes it possible to prevent problems due to damage to an insulating resistor or inflow of high current which may be generated by disconnection between the high voltage circuit and the low voltage circuit after the vehicle is started. In particular, the present invention can prevent these problems by disposing the NC relay 14 between the high capacity single cell or single module of the high voltage battery 10 and the low voltage electric equipment.

For reference, in various embodiments of the present invention, the high voltage relay 12, as shown in FIG. 3, is composed of a main relay (−), a main relay (+), and a pre-charge relay. It is noted that this configuration is an example of a preferred embodiment of the present invention, and that other configurations could also suitably be provided.

Hereafter, the operation of a high voltage system according to an embodiment of the present invention is described with reference to FIGS. 4 and 5.

Figure 4:
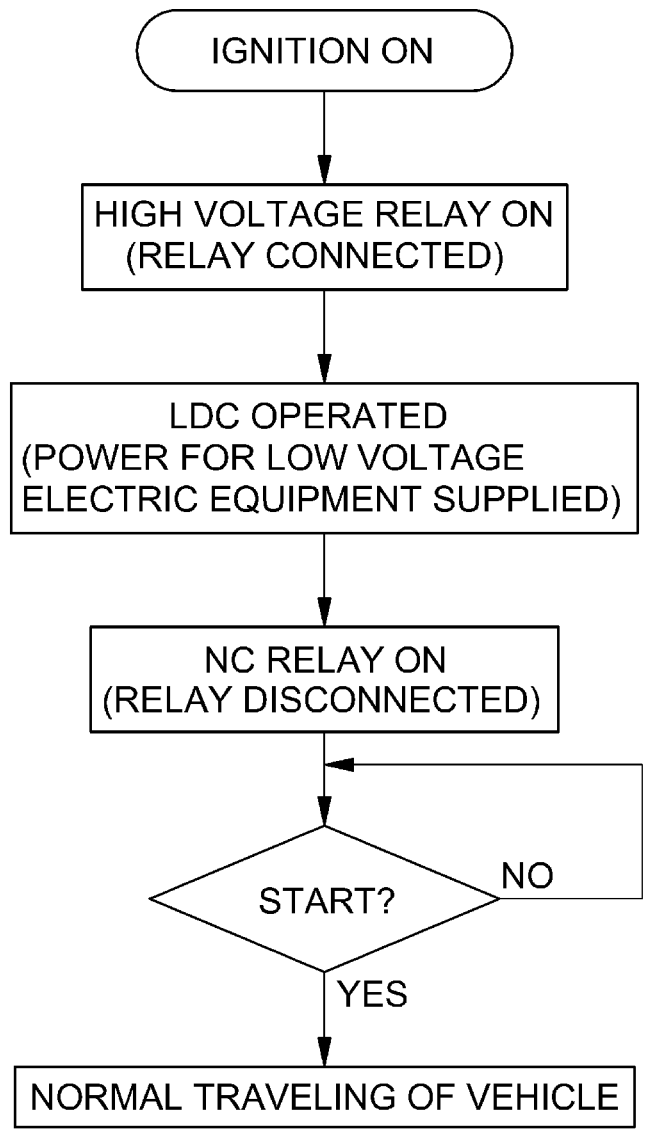
FIGS. 4 and 5 are flowcharts illustrating the operation of a high voltage system of an electric vehicle according to the present invention.

Referring to FIG. 4, at the ignition-on state, the power of the single cell or the single module of the high voltage battery 10 is applied to the high voltage relay 12, such that the high voltage relay 12 is turned on and the high voltage circuit is closed to be connected. Then, the LDC begins operation and the NC relay is turned on, such that the high voltage motor 16 is operated by the power from the high voltage battery 10 in accordance with the start operation, thereby starting the vehicle.

That is, as the high voltage circuit is closed and the LDC initiates operation, the NC relay becomes turned on to start the vehicle while the high voltage circuit and the low voltage circuit remain disconnected.

In this operation, the power of the single cell or the single module of the high voltage battery 10 is used for the initial power of the MCU 15 for controlling the high voltage motor 16.

The power of the high voltage battery 10 is supplied to the low voltage electric equipment by the operation of the LDC 13 after the vehicle is started, in which the NC relay 14 remains turned on and opened, such that the single cell or the single module of the high voltage battery 10 and the low voltage electric equipment are disconnected, and accordingly allowing the vehicle to be driven in a normal fashion.

Figure 5:
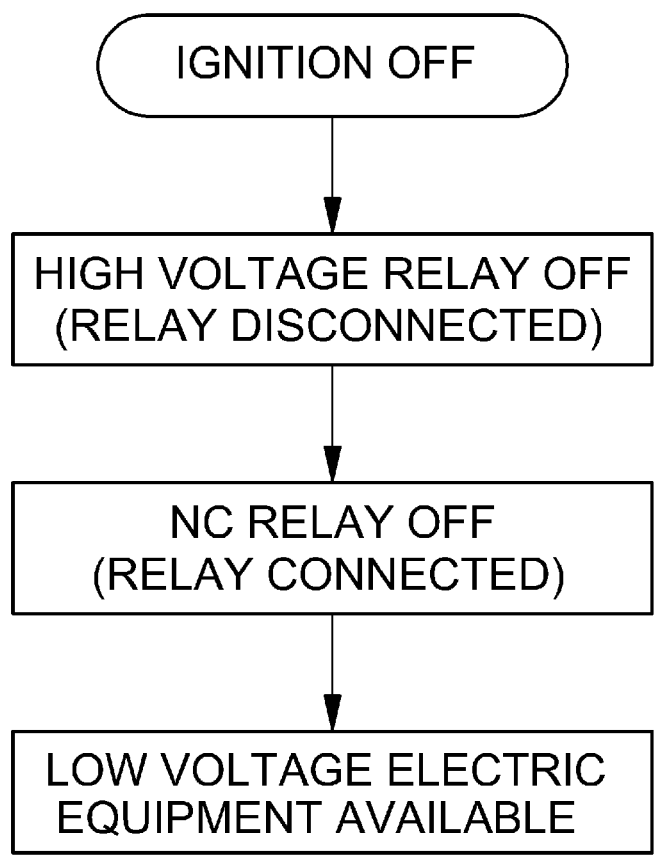

Meanwhile, referring to FIG. 5, at the ignition-off state, the high voltage relay 12 is turned off, and the high voltage battery 10, the LDC 13, the MCU 15, and an FATC 17 (Full Automatic Temperature Controller) are disconnected due to disconnection of the high voltage relay 12, while the NC relay 14 is turned off and the single cell or the single module of the high voltage battery 10 is directly connected with the low voltage electric equipment.

That is, the high voltage battery 10 is disconnected from the high voltage circuit at the ignition-off state, whereas it is connected to the low voltage circuit and functions as the sub-battery.

Accordingly, the low voltage electric equipment can be operated by the power of the high capacity single cell or single module of the high voltage battery 10 even at the ignition-off state.

According to the related art, the power for the common electric equipment and the initial power for the high voltage relay are supplied only from the sub-battery in the high voltage system of an electric vehicle. According to the present invention, the high voltage battery in the high voltage system of an electric system supplies the power for the common electric equipment and the initial power of the high voltage relay when the vehicle is started. Therefore, according to the present invention, the sub-battery is unnecessary and it is possible to remove the sub-battery because the high voltage battery is configured and arranged such that it can function as a sub-battery.

Therefore, it is possible to reduce the additional recurring costs for replacing the sub-battery, to more efficiently use the space in the vehicle by ensuring an advantageous layout, and to further reduce the manufacturing cost and weight in designing a vehicle. Further, it is possible to improve the commercial value of the vehicle by ensuring space while increasing fuel efficiency by reducing the body weight of the vehicle.

Further, since low voltage power can be ensured by the high voltage battery over a long life span, it is possible to prevent frequent replacement of sub-batteries and the additional costs thereof (e.g., cost for replacement battery and labor charges thereof).

The high voltage system of the present invention can be suitably used for all types of electric vehicles that start traveling by means of electric energy of a high voltage battery, such as an EV (Electric Vehicle), an HEV (Hybrid Electric Vehicle), and a PHEV (Plug-in Hybrid Electric Vehicle).

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A high voltage system of an electric vehicle, comprising:
   a high voltage battery consisting of a plurality of cells, wherein one or more cells selected from the plurality of cells of the high voltage battery are directly connected to low voltage electric equipment of the vehicle through an NC relay, the one or more cells being less in number than the plurality of cells; and
   an LDC connected to the high voltage battery through a high voltage relay,
   wherein the high voltage battery turns on the high voltage relay by using power of the one or more cells at ignition-on, and power of the LDC is supplied to the low voltage electric equipment after the ignition-on, and
   wherein the power from the one or more cells of the high voltage battery is supplied to the low voltage electric equipment at ignition-off to allow the one or more cells of the high voltage battery to function in place of a low-voltage sub-battery.

2. The high voltage battery system of an electric vehicle of claim 1 wherein a single cell of the high voltage battery is connected to the low voltage electric equipment such that power of the single cell of the high voltage battery is supplied to the low voltage electric equipment at ignition-off.

3. The high voltage battery system of an electric vehicle of claim 1 wherein only power of the cell of the high voltage battery is supplied to the low voltage electric equipment at ignition-off and after ignition-on.

4. The high voltage battery system of an electric vehicle of claim 1 wherein only power of the cell of the high voltage battery or power of the LDC is supplied to the low voltage electric equipment at ignition-off and after ignition-on.

5. An electric vehicle comprising the high voltage battery system of an electric vehicle of claim 1.

* * * * *